(12) United States Patent
Jacobs

(10) Patent No.: US 6,645,413 B2
(45) Date of Patent: Nov. 11, 2003

(54) METHOD FOR MAKING FACE MASKS FOR RECONSTRUCTIVE SURGICAL PATIENTS

(76) Inventor: Stanley Winston Jacobs, 4868 Hoen Ave., Santa Rosa, CA (US) 95405

( * ) Notice: Subject to any disclaimer, the term of this patent is extended or adjusted under 35 U.S.C. 154(b) by 0 days.

(21) Appl. No.: 09/793,476

(22) Filed: Feb. 26, 2001

(65) Prior Publication Data

US 2002/0117776 A1 Aug. 29, 2002

(51) Int. Cl.[7] .............................................. B29C 33/38
(52) U.S. Cl. ...................................... 264/222; 264/227
(58) Field of Search ................................ 264/219, 222, 264/227

(56) References Cited

U.S. PATENT DOCUMENTS

| | | | | |
|---|---|---|---|---|
| 4,825,263 A | * | 4/1989 | Desjardins et al. | 356/376 |
| 5,264,175 A | * | 11/1993 | Bush | 264/222 |
| 5,373,860 A | * | 12/1994 | Catone | 128/898 |
| 5,591,232 A | * | 1/1997 | Rahimi et al. | 623/16 |
| 5,659,625 A | * | 8/1997 | Marquardt | 382/118 |
| 5,893,872 A | * | 4/1999 | LaFuente | 606/204.35 |

* cited by examiner

Primary Examiner—Allan R. Kuhns
(74) Attorney, Agent, or Firm—Risto A. Rinne, Jr.

(57) ABSTRACT

A method is described that includes making a first impression of the face of a surgical patient prior to the commencing of surgery and of making a second impression of the face after the first impression has been made. Typically, the first and second impressions are a negative first and second impression that are each used in turn to make a first and a second positive impression of the face which are then used for making a comparison therebetween and also for teaching purposes. The second impression may be taken during the actual surgical procedure or it may be taken after surgery has been completed and the patient has fully healed. If desired, a third impression may be made after the second impression has been taken. The third impression is typically a third negative impression that is used to create a third positive impression. The third positive impression is also used for comparison purposes.

16 Claims, 1 Drawing Sheet

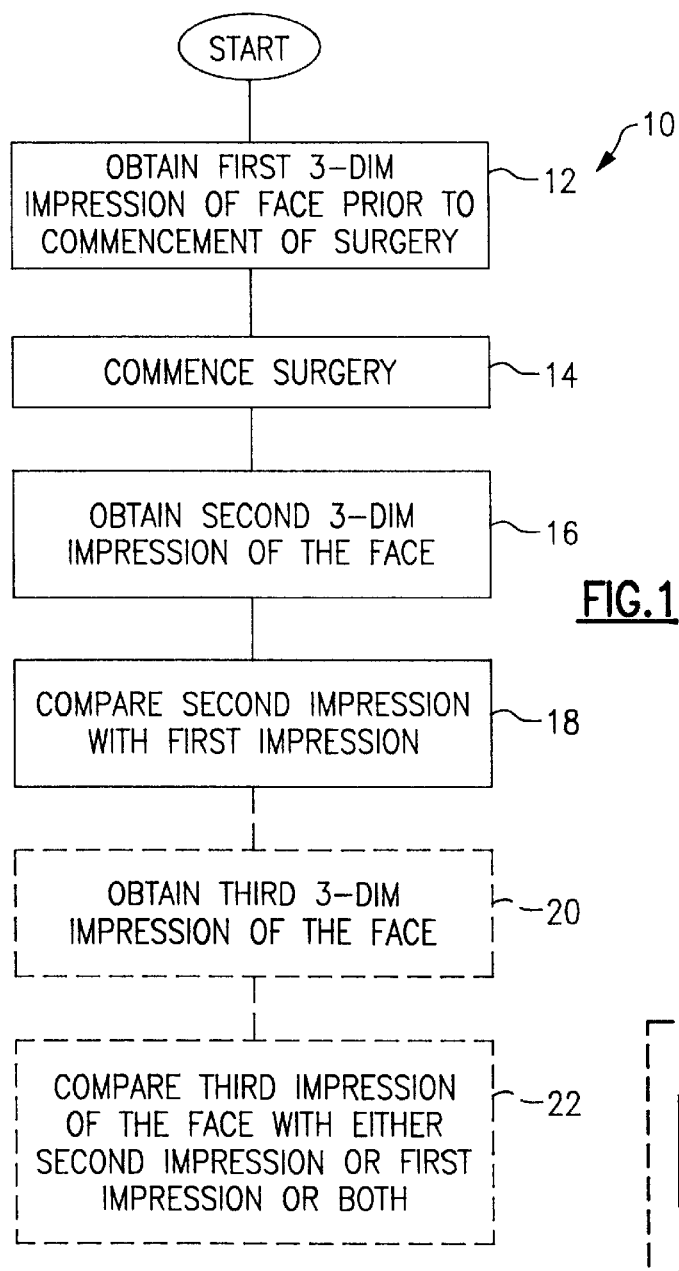

METHOD FOR MAKING FACE MASKS FOR RECONSTRUCTIVE SURGICAL PATIENTS

BACKGROUND OF THE INVENTION

1. Field of the Invention

The present invention, in general relates to reconstructive facial surgery and, more particularly, to methods that permit documenting the three-dimensional appearance of a face before, during, and after reconstructive facial surgery.

People elect to have reconstructive facial surgery performed for a great many reasons. People are sometimes born with or they develop defects and deformities that involve the facial area. Eventually, they rely upon involve the facial area. Eventually, they may rely upon surgery to remedy these types of abnormalities.

Sometimes people experience injury, for example, such as receiving a blunt object type of a trauma as may occur from an automobile or other type of an accident. Such trauma may damage the facial area and therefore require reconstructive surgery.

Patients who either require or elect to have facial reconstructive surgery performed are, at present, unable to adequately and effectively document the progress arising from their reconstructive facial surgery.

The current art of documenting such change relies upon photographs that are taken of the patient before and some time, for example, a few months, after surgery has been completed. These photographs reveal the changes that have taken place, but only in two dimensions.

As such, the changes often appear less dramatic to the patient. In particular, a patient desiring some cosmetic enhancement, for example a change to their nose or to their jaw line or lips may not see much of a change in these "before and after" photographs.

Detecting the changes that have occurred as a result of reconstructive surgery today is a subjective process when one is forced to view a two dimensional image or series of images. There is really no way to take an instrument and literally "measure" dimensions of the face in millimeters, for example, both before and after surgery.

As a result, patients may begin to feel that they did not sufficiently benefit from the surgery that they received. They may develop ill feelings toward their surgeon, and may even seek to have the fees that they paid, refunded. Even worse, they may even file a lawsuit seeking recompense for alleged damages that they claim to have experienced arising from their physical as well as their emotional suffering.

Clearly, these factors are of concern to both the patient and the surgeon. The high cost of malpractice insurance appertaining especially to reconstructive types of surgery must include those types of risks, such as have been described hereinabove. A method that can lessen claims against reconstructive facial surgeons is especially desirable.

Reconstructive facial surgeons (sometimes referred to also as "plastic surgeons") need a method that can better document the changes that have, in fact, taken effect as a result of the reconstructive facial surgery that they perform.

Any method of ameliorating the potential for misgivings on the part of the patient is especially desirable. It can also reduce the time surgeons spend assuaging the fears and concerns of their patients, both before and especially after having had surgery.

Two dimensional photographs as stated hereinabove are ineffective. Subtle, yet meaningful changes in appearance, are altogether lost in two dimensional photographs. Patients end up feeling that they did not benefit, as promised, by the surgery.

It is important to note that vanity, in some instances, is what motivates a person to ascribe to certain elective surgical procedures. That same vanity may distort that person's perception when in the course of his or her life, that person does not experience the gains that they imagined would occur.

If the person thought that if he or she "fixed" their small lips, for example, that he or she would then be more attractive to members of the opposite sex, that person might wrongly conclude that their lips were perhaps not sufficiently (i.e., significantly) altered as a result of the reconstructive surgery that they had performed when other people neglect to take notice of their "lips" or otherwise fail to desire their company.

As mentioned hereinabove, patients may falsely develop some degree of resentment toward their surgeon and may even seek recompense from damages that they believe they have sustained. Armed only with ineffective and non-dramatic photographs, reconstructive surgeons often find it difficult to defend against such claims of malpractice or of failing to provide promised benefits.

What is needed is a way to demonstrate, even to measure, the changes that have occurred, in particular, a method of making both before and after surgery three-dimensional impressions (i.e., masks) of the face.

There is another problem that also exists that needs solution as well. Patients are hesitant to alter the way their face appears because they know that their "old" appearance is forever lost.

At present, when a patient has an elective procedure performed on their face, the pre-surgical appearance in three-dimensions is lost. There is no way for the patient to view, other than photographically, how they once looked.

Patients would like a method that allows them to forever preserve the pre-surgical three-dimensional likeness of their face. They would especially like to compare this "old" look with their "current" appearance.

Also, there is sometimes a need to document how the person's face appeared immediately before surgery for other reasons. If, for example, the person's face was severely damaged by an automobile accident, then it is indeed most important to be able to document the extent and scope of the injuries incurred before performing any reconstructive surgery.

The scope of damage is useful in determining damages for just and appropriate types of litigation. Therefore, it is important to be able to demonstrate the damage inflicted to a person's face before surgery is commenced.

It is also vitally important, at the same time, to perform the surgery as quickly as possible to prevent the person from needlessly having to endure protracted physical and/or psychological discomfort.

Therefore, there are two seemingly conflicting concerns at play; the first being able to well document and even display (i.e., to a judge or jury) the extent of damages inflicted before attempting reconstructive surgery and also a need to quickly remedy this damage.

Indeed, a quick remedy produces less pain and suffering and therefore may even provide a diminished liability arising from such types of injuries.

Also, the use of x-rays and two-dimensional photographs may not be sufficiently compelling or as revealing as is needed to convey to others the true scope of the injuries.

It is important to note that the steps involved with certain types of reconstructive facial surgery include what can be described as a metamorphosis of the face. This metamorphosis occurs in stages.

Certain types of reconstructive surgeries, for example, often require various steps or phases to complete the process. For example, a nose or other bone may first have to be broken before it can be properly altered so as to achieve a more desirable shape or attitude.

Indeed, the face, during reconstructive surgery, may look considerably worse during certain intermediate phases than it did prior to the commencement of surgery. Being able to document this metamorphosis, that is the various stages of surgery, is especially valuable to two groups of people.

The first group are the patients themselves. Seeing the various steps, patients believe that they received their money's worth. Up until now, there has been no way (other than video) for patients to actually see what the various steps look like. Video is too graphic and blood stained for viewing. Surgeons may be reluctant to film the process as well.

Patients would benefit if they were able to see what is tantamount to a "pretty" view of the intermediate steps, one that is not blood stained and unduly graphic. If they could see a more gentle yet revealing three-dimensional likeness of their face during various stages of surgery, they would be both amazed at the metamorphosis that has taken place and they would likely be far more convinced and satisfied that they had indeed received good value from the services of their reconstructive surgeon.

This could lessen the amount of time surgeons spend pointing out the work that they performed and the resultant differences that have occurred in their patient's appearance. A dramatic viewing of these changes early on could also favorably impress the patient, and this early benefit is far more likely to endure than if it was provided many months later after the patient had already developed a negative impression. If it was not timely available, it might instead seem more like an argument that was being made in favor of the surgeon's point of view.

It is also noteworthy that most patients, even after having received a good explanation from their surgeons of the various procedures they will undergo and the experiences they are likely to have, simply cannot visualize how the intermediate steps of surgery will cause them to appear.

All that they really are able perceive is how uncomfortable they feel after surgery and then later, how they look. As stated hereinabove, this too has heretofore been limited to a two-dimensional photograph or video image.

Furthermore, to see the various changes actually taking place upon their own face, their personage, is most convincing of the enormity of effort expended by their surgeon on their behalf.

As mentioned briefly hereinabove, patients often wish to preserve their prior appearance for any number of reasons. First, they may wish to preserve a likeness of their pre-surgical appearance that they can view themselves or show to their progeny that clearly indicates how they once appeared before surgery.

They may use the before and after impressions to reaffirm the correctness of the choice that they made to have the surgery performed. Alternatively, they may wish to preserve it simply for posterity.

Additionally, they may wish to preserve their presurgical appearance to have available as a "fall-back" option. At present, their is no effective benchmark that a surgeon can use to recreate the pre-surgical appearance of the face of a patient. Photographs are too subjective and they fail to reveal how the face actually appeared in three dimensions. There is no way to measure the dimensions of a nose, for example, before and after surgery.

If a patient were able to preserve a three-dimensional likeness of their face prior to surgery, then this would serve as an effective tool for several purposes.

First, it could be used to compare their old appearance with the new appearance after surgery was complete and had fully healed. This would dramatically show the changes that had taken place and would have the benefits as were described hereinabove.

Second, if after a protracted period of time, it became clear that the patient was unable to adjust to his or her new appearance and that the patient was desirous of the pre-surgical appearance, then a three dimensional pre-surgical likeness of their face (i.e., a mask) would provide a skilled surgeon with a "target" to once again aim at.

After again having surgery to their face, eventually that person's appearance would closely proximate their pre-surgical appearance. This "closeness" could be corroborated via an actual measurement and comparison of the before and "after-after likeness of their face.

Success could be realized when such a patient's current mask (i.e., likeness) once again closely resembles the original pre-surgical mask (likeness). Then the patient would know, by way of this compelling physical evidence, that their previous appearance had once again been recaptured.

Subjectivity would, accordingly, be substantially removed from an analysis of results. At present, subjective opinion dominates all analyses involving reconstructive facial surgeries.

Having such a fall back option available for some patients would also provide them with sufficient motivation to overcome their fears and to have certain types of reconstructive facial surgery performed when they otherwise might not. These types of patients would almost certainly greatly benefit from having these surgical procedures.

At present, many patients fear the loss of their current appearance and this fear contributes to a reluctance of having reconstructive surgeries that they need. If there existed a viable possibility that they could once again return to their pre-surgical appearance if they really wanted to do so, then these types of patients would be far more likely to have the needed surgery performed.

The second group who would benefit are the surgeons themselves, in part for the reasons as were stated hereinabove. Yet another group stands to benefit and that group includes surgeons or physicians that are in training.

It would be of enormous value as a teaching tool to provide a method to show surgeons (i.e., interns or even skilled surgeons learning new techniques) the various steps to properly perform a surgical procedure to the face.

To actually be able to study a mask, for example, that shows in three dimensions the exact steps in the metamorphosis of their face that a patient experiences during surgery would be of great benefit to those who are learning the art.

It would also be of great value in teaching new and emergent techniques and methods for surgical procedures as they occur by documenting the stages and, in particular, the appearance of the face as it changes during the essential phases in the surgical process.

Surgeons could also use such impressions as a teaching tool for use with their prospective patients. Impressions made during surgery would provide a rapid way to show to these prospective patients the various steps in the procedures that they are contemplating having. It could also help to prove that a "full and complete disclosure" of the procedure was, in fact made by the surgeon to his patient.

Accordingly, there exists today a need for a method for making face masks for reconstructive surgical patients that preserves the pre-surgical three-dimensional likeness of the face and can provide either a second three-dimensional likeness of the face either during surgery or some time later after surgery is complete.

Clearly, such a method would be useful and especially desirable to surgeons and patients alike.

2. Description of Prior Art

Face masks are, in general, known. For example, the following patents describe various types of devices or methods for making masks and as such are each incorporated herein by reference:

U.S. Pat. No. 5,264,175 to Bush, Nov. 23, 1993;
U.S. Pat. No. 3,537,930 to Anderson, Nov. 3, 1970;
U.S. Pat. No. 2,124,767 to Dawn, Jul. 26, 1938;
U.S. Pat. No. 1,675,202 to Warne, Jun. 26, 1928;
U.S. Pat. No. 996,783 to Moreau, Jul. 4, 1911;
U.S. Pat. No. 803,004 to Mayer, Oct. 31, 1905;
U.S. Pat. No. 339,334 to Searle, Apr. 6, 1886; and
U.S. Pat. No. 223,603 to Neubert, Jan. 13, 1880.

While the structural arrangements of the above described devices and methods, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a method for making face masks for reconstructive surgical patients that preserves a three-dimensional appearance of a face prior to a reconstructive surgical procedure.

It is also an important object of the invention to provide a method for making face masks for reconstructive surgical patients that preserves a three-dimensional appearance of a face after having had a reconstructive surgical procedure.

Another object of the invention is to provide a method for making face masks for reconstructive surgical patients that preserves a three-dimensional appearance of a face during a reconstructive surgical procedure.

Still another object of the invention is to provide a method for making face masks for reconstructive surgical patients that preserves a three-dimensional appearance of a face prior to a reconstructive surgical procedure along with a three-dimensional appearance of the face after having had the reconstructive surgical procedure.

Still yet another object of the invention is to provide a method for making face masks for reconstructive surgical patients that preserves a three-dimensional appearance of a face prior to a reconstructive surgical procedure along with a three-dimensional appearance of the face during the reconstructive surgical procedure.

Yet another important object of the invention is to provide a method for making face masks for reconstructive surgical patients that is useful in demonstrating the efficacy of a reconstructive facial surgical procedure.

Still yet another important object of the invention is to provide a method for making face masks for reconstructive surgical patients that is useful in defending against a claim made against a reconstructive surgeon alleging that the surgical procedure failed to substantially alter the appearance of the face.

One still further important object of the invention is to provide a method for making face masks for reconstructive surgical patients that is useful in teaching the intermediate steps required in a surgical procedure to the face.

One still further useful object of the invention is to provide a method for making face masks for reconstructive surgical patients that is useful in documenting the existence of a deformity.

One still especially valuable object of the invention is to provide a method for making face masks for reconstructive surgical patients that can be used to later create a plurality of a three-dimensional likeness of a face as it existed prior to a reconstructive surgical procedure.

One still especially desirable object of the invention is to provide a method for making face masks for reconstructive surgical patients that can be used to later create a plurality of a three-dimensional likeness of a face as it appeared during a reconstructive surgical procedure.

One still further and especially useful object of the invention is to provide a method for making face masks for reconstructive surgical patients that can be used to later create a plurality of a three-dimensional likeness of a face as it appeared at a given time after a reconstructive surgical procedure had been completed.

Briefly, a method for making face masks for reconstructive surgical patients that is constructed in accordance with the principles of the present invention includes making a first negative impression of the face of a patient prior to performing a surgical procedure involving any portion of the face. The first negative impression is used to create a first positive impression of the face. A second negative impression is made of the face at a later time. The second negative impression is used to create a second positive impression of the face. The second positive impression is compared with the first positive impression to see, in three-dimensions, the changes that have occurred. If desired, a third negative impression is made of the face at an even later time and is used to create a third positive impression of the face. The third positive impression is then used for comparison, in three dimensions, of either the first or second positive impressions, as desired. Any known technique may be used to form the negative or positive impressions. The second negative impression may be taken during the surgical procedure or it may be taken after the surgical procedure has been completed. The third negative impression may be taken during the surgical procedure after the second negative impression has been taken or at any time that is desired after the surgical procedure has been completed, providing the second negative impression has already been taken.

BRIEF DESCRIPTION OF THE DRAWINGS

FIG. 1 is a block diagrammatic view of a method for making face masks for reconstructive surgical patients.

FIG. 2 is a more detailed view of the first step as shown in FIG. 1.

DETAILED DESCRIPTION OF THE INVENTION

Referring to all of the drawings and in particular to FIG. 1 is shown, a method for making face masks for reconstructive surgical patients, identified in general by the reference numeral 10.

A first step 12 is to obtain a first three-dimensional impression of the face of a patient (not shown) prior to the commencement of a reconstructive surgical procedure.

The first step 12 is accomplished using any known method capable of obtaining the first three-dimensional impression of the face. A preferred method for accomplishing the first step 12 is described in greater detail hereinbelow and is shown in FIG. 2.

A second step 14 is to commence the reconstructive surgical procedure. The reconstructive surgical procedure may be either partially completed or entirely completed during the second step 14 depending upon the wishes of a surgeon (not shown) or the patient.

For example, if it is desirable to obtain a three-dimensional representation of the patient's face during any intermediate stage of the reconstructive surgical procedure, the second step 14 would therefore not include the completion of the reconstructive surgical procedure.

If, however, it was not necessary to obtain a three-dimensional representation of the patient's face during any intermediate stage of the reconstructive surgical procedure, the second step 14 would then represent the completion of the entire reconstructive surgical procedure.

A third step 16 is to obtain a second three-dimensional impression of the face of the patient after the commencement of the reconstructive surgical procedure. As mentioned hereinabove, this may or may not include completion of the surgical procedure.

A fourth step 18 is to compare the second three-dimensional impression with the first three-dimensional impression to optimally determine the progress arising from the reconstructive surgical procedure.

An optional fifth step 20 (shown in dashed lines) is to obtain a third three-dimensional impression of the face at a predetermined later time or during some later point of the reconstructive surgical procedure after having first obtained the second three-dimensional impression.

An optional sixth step 22 (shown in dashed lines) is to compare the third three-dimensional impression of the face with either the second three-dimensional impression or with the first three-dimensional impression, or if desired, with both of the previous impressions.

If desired, an optional fourth impression (not shown) may be obtained at a predetermined period of time after the third and it may be compared with any of the impressions that were obtained prior to it.

Referring now in particular to FIG. 2, the first step 12 is shown in greater detail inside of a dashed box.

In order to complete the first step 12 it is necessary to obtain a first negative impression 24 of the face. The first negative impression 24 may be obtained using any known method for doing so.

While any method may be used, it is important to remember that the first negative impression 24 is that of a human face (or portion thereof). Accordingly, care must be taken to lessen the possibility of causing infection or discomfort to the patient.

Accordingly, a preferred method is to first prepare the patient's face. This is accomplished by first applying a petroleum jelly, such as VASELINE brand, to the hair line and to the patient's eyelashes and eyebrows, which are then pulled up and out of the way as much as possible.

A sterile preparatory solution is then applied over the patient's face to provide a sterile layer intermediate the patient's face and anything applied thereto. One suitable brand of preparatory solution is marketed under the tradename of BETADINE PREP.

The next step is to mix a known type of a two-part silicone solution. The silicone solution is used for the making of a "mask" of the face. A "mask" is a term used in the arts to include any negative or positive three dimensional impression or likeness of a face.

The preferred silicone solution is a commercially available product that is marketed under the tradename of DER-MASIL.

The silicone solution is then brushed on the patient's face. After it is allowed to set (i.e., to cure) for approximately 7-8 minutes, a plurality of plaster splint strips are dipped in warm water and are placed on top of the silicone solution.

The plaster splint strips are well known in surgery and are commonly used for making plaster splints and casts to treat fractures and various similar injuries.

The preferred plaster splint strips are approximately three inches wide by fifteen inches long, and as such are an ideal size to accommodate the surface irregularities of the face and its size.

The silicone solution, after it cures, remains flexible. It is preferred to have a rigid first negative impression of the face to use in creating a first positive impression 26 of the face (as is described in greater detail hereinafter).

The purpose of the plaster splint strips is to provide a rigid backing to the silicone solution so that, once set (i.e., cured), the first negative impression may be lifted from the face as a rigid unit.

Typically, several of the plaster splint strips are applied over the silicone solution. Another seven to eight minutes approximately are provided for the silicone solution to cure and also for the plaster splint strips to harden.

The first negative impression 24 is then lifted directly off of the face. An airway is provided during this entire process for the patient to breath through their nose by the use of straw segments that are placed in each nostril.

In a similar manner, a second negative impression is obtained as a prerequisite step in order to perform the third step 16 and, if desired, a third negative impression is obtained as a prerequisite step in order to perform the fifth step 20.

In order to complete the first step 12, it is necessary to use the first negative impression 24 to create the first positive impression 26.

An anti-stick coating is sprayed inside the first negative impression 24. Plaster of Paris is mixed and is poured into the first negative impression 24 and is allowed to harden into the first positive impression 26. The first negative impression 24 is then turned upside-down to allow the first positive impression 26 to fall therefrom.

Normally, the second step 14 is commenced prior to completion of the first step 12. Once the first negative impression 24 has been obtained, the surgeon will not typically wait to create the first positive impression 26 before commencing surgery.

The second step 14 is accomplished and surgery is commenced. The third step 16 is performed in a manner that is essentially identical to the first step 12. The third step 16 may be performed either during surgery, immediately after completion of surgery, or later when the patient is fully healed.

If the third step 16 is performed during surgery or immediately after completion, it may be necessary to treat certain areas of the face first to either stop or reduce bleeding.

After the reconstructive surgical procedure has been completed there is ample opportunity to use the first negative impression 24 and the second negative impression to create the first positive impression and the second positive impression.

If desired, the first negative impression 24 and the second negative impression may be used to create as many first and second positive impressions as are desired. The positive impressions may be used for any of the purposes herein described, however use of all of the second positive impressions include comparison with the first positive impression 24 to optimally show the changes occurring as a result of the reconstructive surgical procedure.

If the third impression (or the fourth) are desired, a third or fourth respective negative impression are obtained and are used to create as many third and fourth positive impressions as are desired.

Certain types of reconstructive surgical procedures cannot be completed at one time. They must be performed in stages and allow time for healing to occur. Accordingly, the method for making face masks for reconstructive surgical patients 10 is repeated for each stage of the reconstructive surgical procedure.

It is noted that the terms "reconstructive surgery", "reconstructive surgical patient(s)", and "reconstructive facial surgery" as used herein are intended to include all types of facial surgeries, that is any type of a surgical procedure that affects the face. These terms as used herein, therefore, include all types of facial surgery that may be considered as either cosmetic, optional in nature, mandatory in nature, reparative, or reconstructive.

If the surgery results in a change in three dimensions to any part of the face, the presently disclosed methods are applicable, regardless of what the surgical procedure is to be called, and all such procedures are to be considered as being encompassed within the scope of this disclosure.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A method for making face masks for a reconstructive surgical patient, comprising the steps of:
    (a) making a first impression of a face of the surgical patient prior to commencing surgery upon the face, said first impression including a three-dimensional structure;
    (b) making a second impression of the face of the surgical patient after commencing surgery upon the face, said second impression including a three-dimensional structure; and
    wherein said first impression is a negative first impression of the face; and
    wherein the step of making said negative first impression includes the steps of:
        (a) preparing the face of the patient;
        (b) applying a silicone solution to the face of the patient;
        (c) allowing a first predetermined period of time for the silicone solution to set;
        (d) applying a plurality of plaster of Paris strips to the silicone solution;
        (e) allowing a second predetermined period of time for the silicone solution and the plurality of plaster of Paris strips to set; and
        (f) removing the silicone solution and the plurality of plaster of Paris strips from the face as a unit.

2. A The method for making face masks for a reconstructive surgical patient of claim 1, including the step of making a positive first impression from said negative first impression.

3. The method for making face masks for a reconstructive surgical patient of claim 2, wherein the step of making said positive first impression includes the step of making a first plaster of Paris cast.

4. The method for making face masks for a reconstructive surgical patient of claim 2, wherein said second impression is a negative second impression of the face.

5. The method for making face masks for a reconstructive surgical patient of claim 4, wherein the step of making said negative second impression includes the steps of:
    (a) preparing the face of the patient;
    (b) applying a silicone solution to the face of the patient;
    (c) allowing a first predetermined period of time for the silicone solution to set;
    (d) applying a plurality of plaster of Paris strips to the silicone solution;
    (e) allowing a second predetermined period of time for the silicone solution and the plurality of plaster of Paris strips to set; and
    (f) removing the silicone solution and the plurality of plaster of Paris strips from the face as a unit.

6. The method for making face masks for a reconstructive surgical patient of claim 4 includes the step of making a positive second impression from said negative second impression.

7. The method for making face masks for a reconstructive surgical patient of claim 6, wherein the step of making said positive second impression includes the step of making a second plaster of Paris cast.

8. The method for making face masks for a reconstructive surgical patient of claim 6, including the additional step of comparing said second positive impression with said first positive impression.

9. The method for making face masks for a reconstructive surgical patient of claim 1 wherein said second impression is made during said surgical procedure.

10. The method for making face masks for a reconstructive surgical patient of claim 1 wherein said second impression is made after said surgical procedure has been completed.

11. The method for making face masks for a reconstructive surgical patient of claim 1 wherein said second impression is made during said surgical procedure and including the step of making a third impression of the face of the surgical patient after said second impression has been taken.

12. The method for making face masks for a reconstructive surgical patient of claim of claim 11, wherein said third impression is made during said surgical procedure.

13. The method for making face masks for a reconstructive surgical patient of claim of claim 11, wherein said third impression is made after said surgical procedure has been completed.

14. The method for making face masks for a reconstructive surgical patient of claim 1 wherein said second impression is made during said surgical procedure and including the additional steps of making a plurality of impressions of the face of the surgical patient, each of said plurality of impressions being made sequentially after said second impression has been taken.

15. A method for making face masks for a reconstructive surgical patient, comprising the steps of:
    (a) making a first impression of a face of the surgical patient prior to commencing surgery upon the face; and (b) making a second impression of the face of the surgical patient after commencing surgery upon the face and wherein said first impression is a negative first impression of the face and wherein the step of making said negative first impression includes the steps of:
  (a) preparing the face of the patient;
  (b) applying a silicone solution to the face of the patient;
  (c) allowing a first predetermined period of time for the silicone solution to set;
  (d) applying a plurality of plaster of Paris strips to the silicone solution;
  (e) allowing a second predetermined period of time for the silicone solution and the plurality of plaster off Paris strips to set; and
  (f) removing the silicone solution and the plurality of plaster of Paris strips from the face as a unit.

16. A method for making face masks for a reconstructive surgical patient, comprising the steps of:
  (a) making a first impression of a face of the surgical patient prior to commencing surgery upon the face; and
  (b) making a second impression of the face of the surgical patient after commencing surgery upon the face and wherein said second impression is made during said surgical procedure and including the step of making a third impression of the face of the surgical patient after said second impression has been taken.

* * * * *